Jan. 10, 1928.
C. NICHOL
1,655,771
GRAIN LOADER
Filed Sept. 21, 1926 2 Sheets-Sheet 1
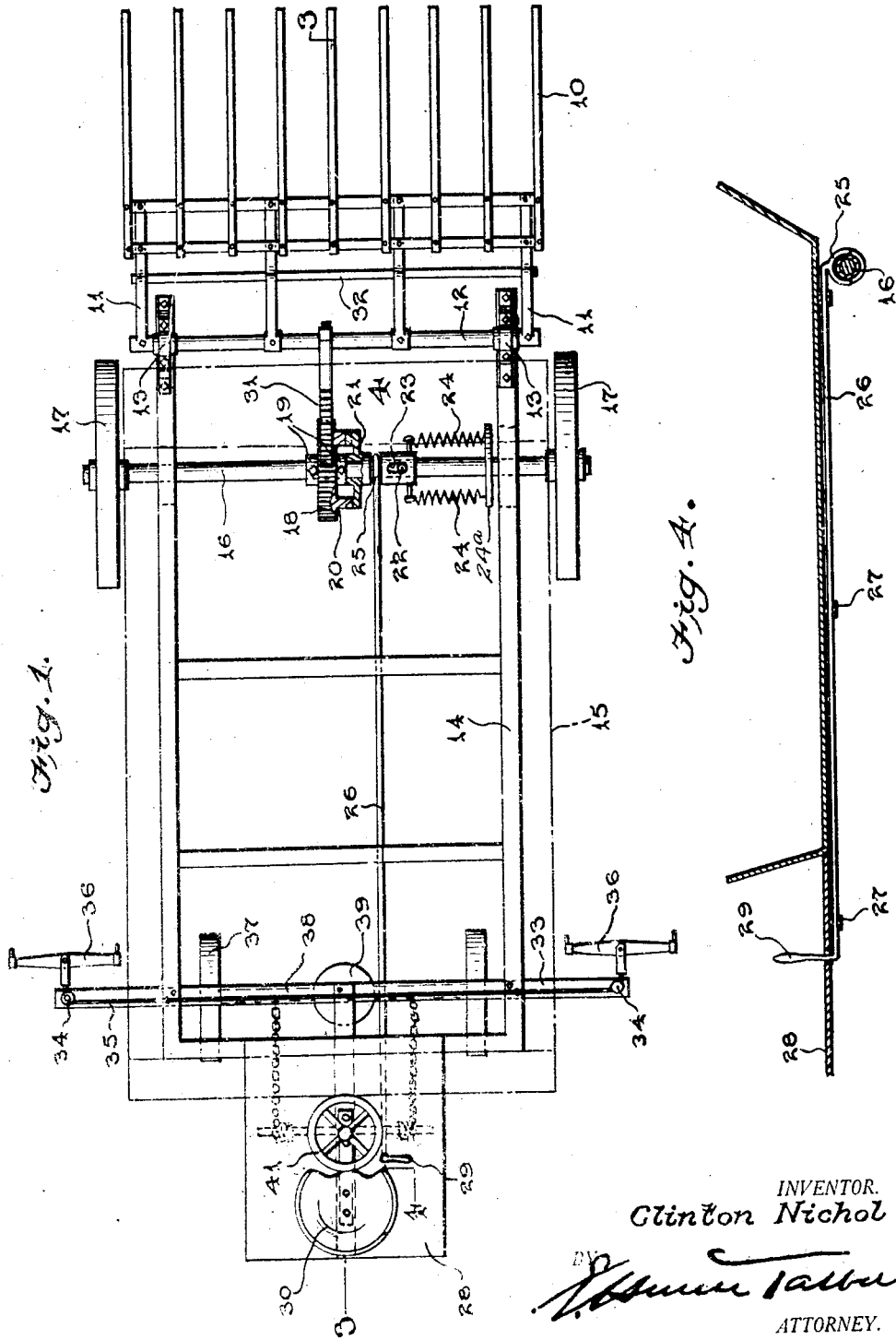
INVENTOR.
Clinton Nichol
ATTORNEY.

Jan. 10, 1928.
C. NICHOL
1,655,771
GRAIN LOADER
Filed Sept. 21, 1926  2 Sheets-Sheet 2
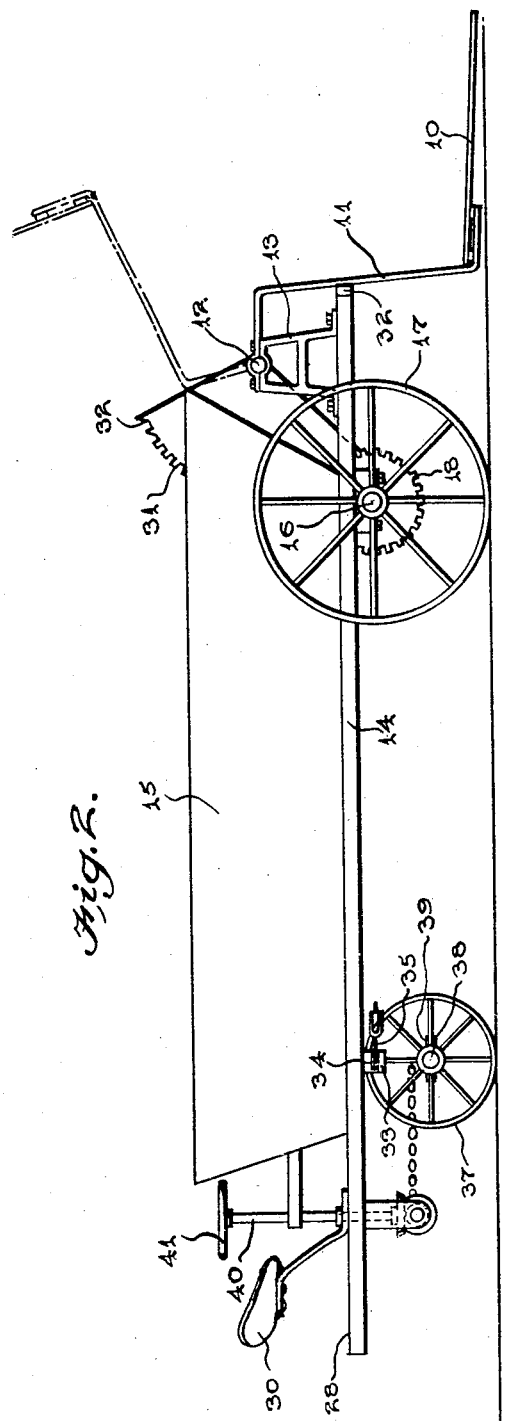
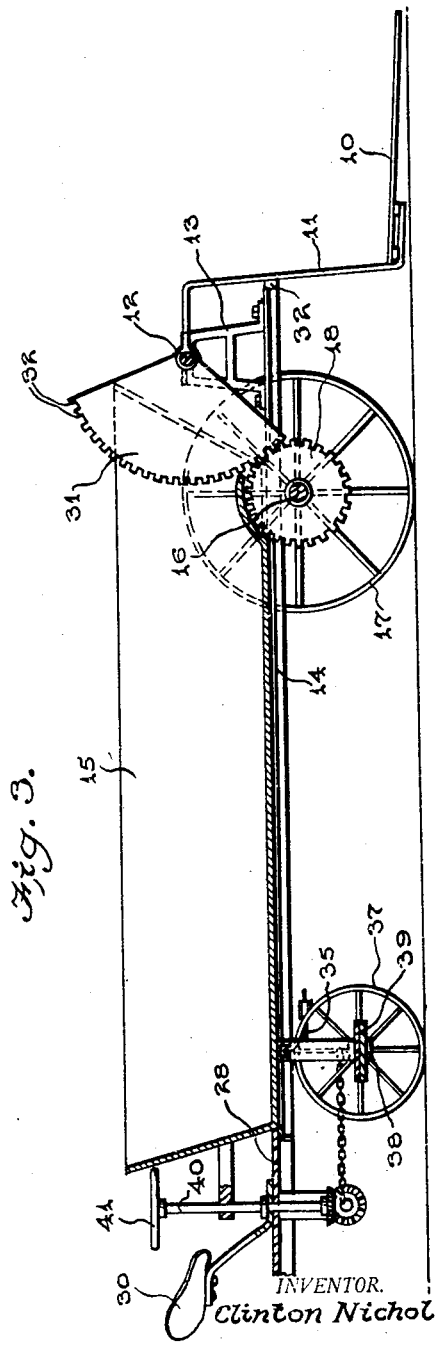
INVENTOR.
Clinton Nichol
BY
ATTORNEY.

Patented Jan. 10, 1928.

1,655,771

UNITED STATES PATENT OFFICE.

CLINTON NICHOL, OF PONCA CITY, OKLAHOMA.

GRAIN LOADER.

Application filed September 21, 1926. Serial No. 136,810.

The object of the invention is to provide a cheap and simple form of apparatus adapted for movement by draft animals rather than a tractor and comprising a body for the reception of the cut grain and a fork carried at the forward end of the body to gather the grain from the ground or from windrows and deposit it in the body; to provide means for the actuation of the fork by appropriate operative connections with one of the axles of the apparatus; and to provide operator-controlled means by which the fork may be actuated in accordance with the judgment of the operator.

With this object in view, the invention consists in a construction and combination of parts of which a preferred embodiment is illustrated in the accompanying drawings, wherein:

Figure 1 is a top plan view of the invention, the body being indicated in dotted lines.

Figure 2 is a side elevational view of the invention.

Figures 3 and 4 are, respectively, longitudinal sectional views on the planes indicated by the lines 3—3 and 4—4 of Figure 1.

The fork 10, which is designed for movement close to and parallel with the ground, consists of a series of tines carried at the lower ends of Z-shaped arms 11, the latter being uniformly spaced along a shaft 12 journaled in upstanding hangers 13. The hangers are bolted or otherwise secured to the forward extremities of the side bars of the frame 14 which supports the body 15, the latter being designed for the reception of the grain gathered by the fork.

The shaft 12 is actuated or rotated by means of an operative connection with the forward axle 16, the latter being provided with the ground wheels 17 secured to the axle to impart turning movement to the same as the apparatus is advanced over the ground. Floatingly mounted on the axle 16 is a spur gear 18 on opposite sides of which are mounted the collars 19, the latter being secured to the axle 16. The gear 18 is provided with a clutch element 20 engageable with a clutch element 21 axially movable of the axle but precluded from rotary movement thereon, the specific construction shown consisting of a pin 22 mounted in the axle and engaging a longitudinal slot 23 in the clutch element 21.

Contractile springs 24 are tensioned between the clutch element 21 and a disk 24ª fixed to the axle and tend normally to separate the two clutch elements, engagement of the two being effected in opposition to the tension of the springs by means of a shifter fork 25 of which the stem 26 extends longitudinally of the frame, being journaled in bearings 27 mounted on the under face of the body. The remote extremity of the shifter fork is upturned and extends through the rear platform 28, terminating in a foot pedal 29 by means of which the stem may be turned and the fork actuated by the operator occupying the seat 30, the latter being mounted on the rear platform.

The shaft 12 carries a sector 31, the teeth of which mesh with the teeth of the gear 18 but, with the clutch elements disengaged, the weight of the fork keeps it in the lowered position close to the ground with the arms 11 abutting the transverse bar 32 mounted at the forward ends of the side bars of the frame. As the vehicle is advanced and a sufficient quantity of grain is accumulated on the fork, the latter is raised by the axle 16 after the engagement of the clutch elements 20 and 21 by the depression of the foot pedal 29 until finally, when the fork reaches the dotted line position indicated in Figure 2, the grain carried thereon is deposited into the body 15.

The teeth at one end of the sector are reduced in thickness so that when the sector passes out of mesh with the gear in the extreme elevated position of the fork, the sector may readily drop back into mesh and the fork thus elevated again the short distance which it dropped, this cycle of operations being repeated so long as the clutch elements are engaged and the fork thus subjected to a slight vibratory movement which will free it of all the contained grain. Upon the release of the clutch pedal 29, the springs 24 will function to disengage the clutch elements 20 and 21 when, the gear 18 being free, the fork will drop to its lower position by gravity, to be again operated in the manner before described after the accumulation of the desired quantity of grain thereon.

The movement of the vehicle is designed to be accomplished in any acceptable way but particularly by means of draft animals and to this end the frame is provided with a transverse bar 33 projecting laterally of the frame and provided terminally with pulleys 34 over which is trained a cable 35 to the extremities of which are connected singletrees 36 to which the draft animals are hitched, this arrangement providing for evening the draft on the two animals which, as indicated, are disposed respectively on opposite sides of the vehicle.

Steering is effected from the rear by means of the spaced supporting wheels 37 carried on an axle 38 turning on a fifth wheel 39 through the instrumentality of an upright post 40 carrying at its upper end a steering wheel 41 located for convenient operation from the seat 30.

The invention having been described, what is claimed as new and useful is:

A grain loader comprising a vehicle provided with supporting wheels at its forward end and an axle on which said wheels are carried, the axle being rotated with the wheel, a fork disposed at the forward end of the vehicle and carried by a transverse shaft rotatably mounted on the vehicle, a gear floatingly mounted on the axle, a toothed sector carried by said shaft and meshing with the gear, and cooperating clutch elements carried by the gear and axle respectively, the sector at one end having its teeth reduced in thickness to permit ready remeshing with the gear after having passed out of mesh with the latter.

In testimony whereof he affixes his signature.

CLINTON NICHOL.